No. 680,596. Patented Aug. 13, 1901.
C. H. JAEGER.
ROTARY BLOWER.
(Application filed Feb. 6, 1901.)
(No Model.)
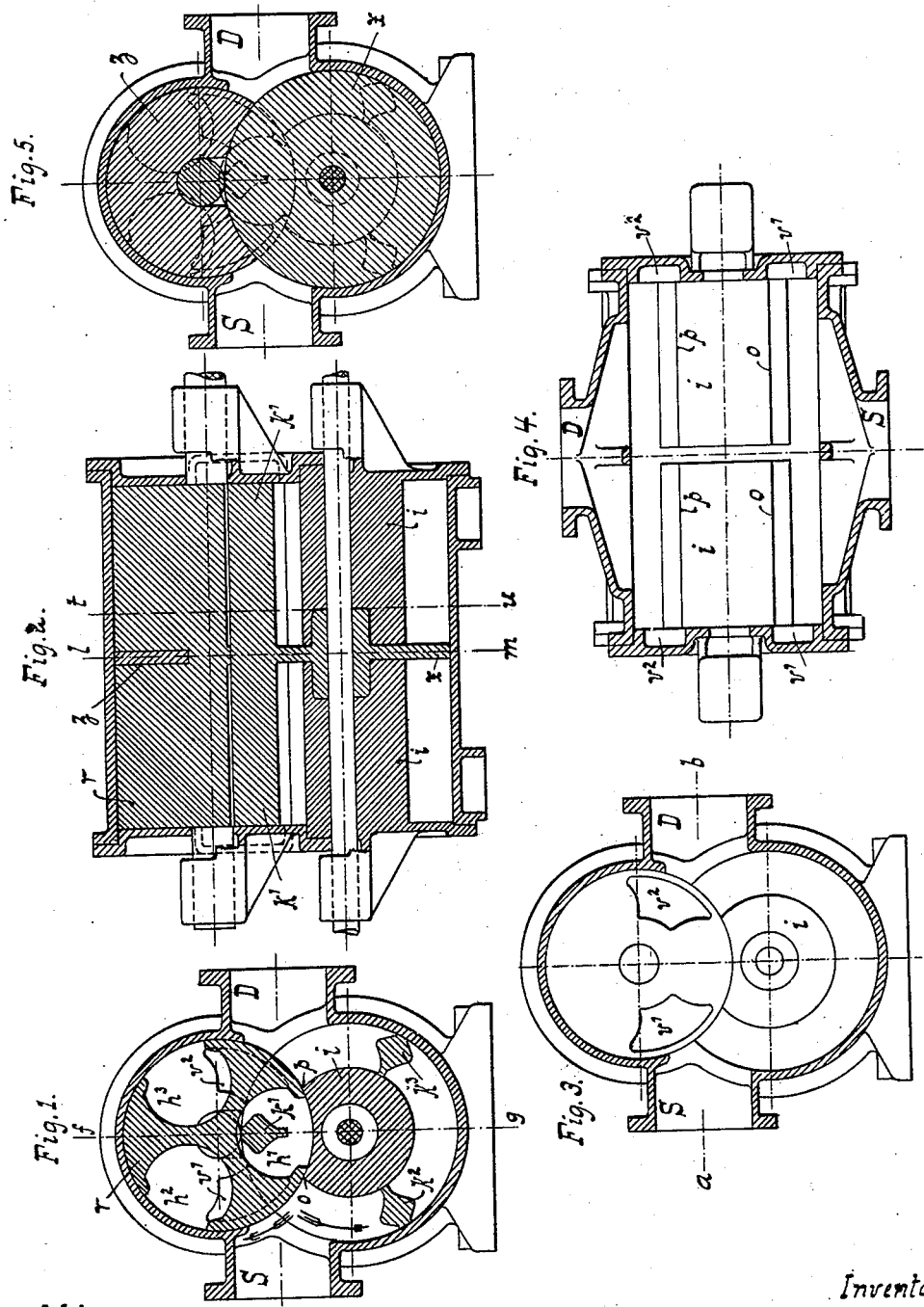
Witnesses:
Inventor:
Carl Hermann Jaeger
By
Hauff & Hauff
His Attorneys.

UNITED STATES PATENT OFFICE.

CARL HERMANN JAEGER, OF LEIPSIC, GERMANY.

ROTARY BLOWER.

SPECIFICATION forming part of Letters Patent No. 680,596, dated August 13, 1901.

Application filed February 6, 1901. Serial No. 46,198. (No model.)

*To all whom it may concern:*

Be it known that I, CARL HERMANN JAEGER, a subject of the Emperor of Germany, residing at Leipsic-Plagwitz, Germany, have invented new and useful Improvements in Rotary Blowers, of which the following is a specification.

The present invention relates to an improvement in rotary blowers having two cylinders intersecting each other and pistons mounted or carried on a shaft rotating in fixed bearing-blocks contained in one half of the casing, said pistons entering recesses provided in the rotating cylinder or drum contained in the other half of the casing.

The improvement consists in the provision of means whereby at suitable moments the compressed air contained in a drum-recess approaching the suction-chamber is enabled to enter a drum-recess retreating from the said chamber. By this means the compressed air in the first-mentioned recess instead of being carried to the suction side of the blower is returned to the pressure side, noise at the suction side being thereby prevented.

The invention is illustrated by the annexed drawings, in which—

Figure 1 is a cross-section of the blower along line $t\ u$, Fig. 2. Fig. 2 is a longitudinal section taken on the line $f\ q$ of Fig. 1. Fig. 3 is a cross-section along line $l\ m$, Fig. 2, the pistons and drum being removed. Fig. 4 is horizontal section taken on the line $a\ b$ of Fig. 3. Fig. 5 is a cross-section along line $l\ m$, Fig. 2.

The housing or wall of the device, as seen in Figs. 1 and 3, is in shape of two cylinders partly cutting into one another, or it might be said to somewhat resemble the numeral 8, with upper and lower chambers or cylinders. The open ends of the casting or housing are closed by covers suitably fixed in place, and the covers of the lower cylinder are provided or cast with blocks or fixed lugs $i$, having perforations forming a bearing for a rotary shaft carrying a hub with disk $x$, from which project the wings or pistons $k'\ k^2\ k^3$. The blocks $i$ being fixed or cast to the inner faces of the lower pair of covers project toward one another when the parts are assembled, but do not come into contact with one another, so as to leave a space, as seen in Fig. 1, in which the disk or spoke portion $x$ of the lower shaft can rotate or be seated. The covers of the upper housing section or cylinder form bearings for the rotary shaft of drum $r$. Said drum and pistons rotate in unison or with equal number of revolutions, and the shafts of the drum and pistons can be geared or connected together by suitable means— as, for example, gear-wheels. (Not shown.) The gear-wheels are of course to be applied to those parts of the shafts projecting outside the housing or shell.

The drum $r$ is provided with chambers $h'\ h^2\ h^3$, corresponding to the pistons $k'\ k^2\ k^3$, and during the operation or rotation of the parts each piston—as, say, for example, $k'$— enters its repective drum-chamber, as $h'$, but without coming into contact with the walls of these drum-chambers. These drum-chambers extend or cut through the ends of the drum; but at the circumference of the drum the mouths of the chambers are so small or contracted to such an extent that when a chamber, as $h'$, is, for example, in the position shown in Fig. 1 such chamber will be closed by the concave or cut-away portion or seat $o\ p$ of the blocks $i$. The drum $r$ is also provided with a circumferential groove for accommodating the disk $x$, the pistons $k'$ to $k^3$ of which, as already noted, enter the drum-chambers.

The plate $z$, Fig. 2, fixed or secured to the shell and made to enter the circumferential groove of the drum, will steady or guide the latter in its revolutions. The shell is shown with openings D and S. Suppose the drum and pistons to rotate in the direction indicated by arrows shown in Fig. 1. Then S will be the suction and D the pressure side or mouth of the blower. When a chamber in its rotation returns to the suction S, the compressed air escaping from such chamber would ordinarily be lost and in its escape cause a noise. To avoid this objection, the end covers, as seen in Figs. 3 and 4, are provided with recesses $v'\ v^2$, which are given a certain shape for a purpose presently explained. Take, for example, the position of parts indicated in Fig. 1. Before the edge of chamber $h'$ clears or opens at the edge $o$ the ends of such chamber $h'$ pass partly over the edge of or enter into communication with the recess $v'$. Such recess thus forms a communication between chambers $h'$ and $h^2$, and thus allows the compressed air to flow from chamber $h'$ to chamber $h^2$ until the edge of chamber $h'$ has passed the edge $o$, and at the same time the chamber $h^2$ has been carried past recess $v'$ or the communication through the latter from chamber $h'$ to chamber $h^2$ has been cut off. In this manner an appreciable portion of the live or compressed air is regained, as the chamber $h^2$ having caught part of such compressed air carries the same back to the pressure-mouth D. The recesses $v'\ v^2$ are shown of symmetrical shape or so formed that the device will work when the rotation takes place in either direction.

To make it clear how the compressed air is held back in the chamber $h^2$ as soon as chamber $h'$ has passed point $o$, the following explanation can be given: Taking the position of parts shown in Fig. 1, with the chamber $h'$ in the position shown, the recess or conduit $v'$ is just about to connect chambers $h'$ and $h^2$, whereupon a flow of compressed air from $h'$ to $h^2$ will at once take place. As soon, however, as the chamber $h'$ is opened at the point or edge $o$ the lower edge or boundary of chamber $h^2$ at the same moment passes the upper boundary or edge of recess $v'$, and thus closes communication through the same, so that from this point on the chamber $h^2$ is no more in communication with the atmosphere.

Having now described my invention, what I claim, and desire to secure by Letters Patent, is—

1. A blower provided with suction and pressure openings or sides and with fixed inner blocks or cylinders, rotary pistons mounted in said blocks, a rotary drum having chambers into which the pistons are made to enter, and covers provided with recesses or conduits with which the drum-chambers are made to communicate so that a drum-chamber leaving the pressure side, and advancing toward the suction side of the blower, is connected for the time being with the drum-chamber leaving and shut off from the suction side, whereby the compressed air from the first said chamber enters the second said chamber and is returned to the pressure side, noise at the suction side being thereby prevented, all substantially as set forth.

2. A blower comprising a shell with upper and lower cylinder-shaped portions, the outlines or peripheries of which cut or extend partly into one another, end covers for the lower portion, blocks or bearings extended from these covers inwardly toward one another, a rotary shaft provided with pistons and having its bearings in said blocks, recessed covers for the upper shell portion, and a rotary drum provided with chambers made to communicate with said recesses and into which the pistons are made to enter, substantially as described.

3. A blower shell or casing combined with a chambered rotary drum and rotary pistons made to enter the drum-chambers, and fixed blocks or cylinders forming a bearing for the pistons and having a concave portion or face made to fit the drum and close the chambers, said shell having recesses or conduits for establishing communication from one chamber to another, substantially as described.

4. A blower having a suction and pressure side or opening and inner cylinders or blocks, pistons made to rotate about the blocks, a drum chambered for the entry of the pistons, and covers having conduits or channels for establishing communication between a drum-chamber passing from the pressure to the suction side and a chamber closed against the suction so as to charge or supply the latter with compressed air for conducting the same to the pressure space and prevent the occurrence of noise, substantially as described.

5. A blower shell or casing combined with a chambered and grooved rotary drum and rotary pistons made to enter the drum-chambers, and fixed blocks or cylinders forming a bearing for the pistons and having a concave portion or face made to fit the drum and close the chambers, said shell having recesses or conduits for establishing communication from one chamber to another, and a guide-flange $z$ for entering the groove in the drum, substantially as described.

In testimony whereof I have hereunto set my hand in the presence of two subscribing witnesses.

CARL HERMANN JAEGER.

Witnesses:
 RUDOLPH FRICKE,
 CHAS. J. BURT.